(12) United States Patent
Rule et al.

(10) Patent No.: US 9,370,876 B2
(45) Date of Patent: Jun. 21, 2016

(54) MOLDED MICROSTRUCTURED ARTICLES AND METHOD OF MAKING SAME

(75) Inventors: Joseph D. Rule, Cottage Grove, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 361 days.

(21) Appl. No.: 12/999,026

(22) PCT Filed: Apr. 9, 2009

(86) PCT No.: PCT/US2009/040002
§ 371 (c)(1),
(2), (4) Date: Feb. 11, 2011

(87) PCT Pub. No.: WO2009/154849
PCT Pub. Date: Dec. 23, 2009

(65) Prior Publication Data
US 2011/0129644 A1 Jun. 2, 2011

Related U.S. Application Data

(60) Provisional application No. 61/074,428, filed on Jun. 20, 2008.

(51) Int. Cl.
*B32B 3/30* (2006.01)
*B29C 35/02* (2006.01)
(Continued)

(52) U.S. Cl.
CPC . *B29C 35/02* (2013.01); *B24D 3/20* (2013.01); *B24D 11/001* (2013.01);
(Continued)

(58) Field of Classification Search
None
See application file for complete search history.

(56) References Cited

U.S. PATENT DOCUMENTS 4,400,340 A  8/1983  Klosiewicz
4,481,344 A  11/1984 Newburg
(Continued)

FOREIGN PATENT DOCUMENTS

EP   0758657 A2   2/1997
EP   1 298 156    4/2003
(Continued)

OTHER PUBLICATIONS

Bazan et al., Living Ring-Opening Metathesis Polymerization of 2,3-Difunctionalized Norbornadienes by Mo(Ch-$t$-Bu)(N-2,6-$C_6$ $H_3$-$i$-$Pr_2$)(O-$t$-Bu)$_2$, Journal of the American Chemical Society, vol. 112,Issue 23, Nov. 1990, pp. 8378-8387.
(Continued)

*Primary Examiner* — David Sample
*Assistant Examiner* — Donald M Flores, Jr.
(74) *Attorney, Agent, or Firm* — Adrian L. Pishko

(57) ABSTRACT

Disclosed herein are microstructured articles that can be made by molding. The microstructured articles comprise crosslinked unsaturated polymers formed by ring opening metathesis polymerization (ROMP) of a monomer composition, the monomer composition comprising a cyclic monomer having at least one reactive double bond. The microstructured articles may be structured in that they comprise at least one microstructured feature having a dimension of less than about 2 mm, or less than about 500 um. The microstructured articles may also comprise a plurality of such microstructured features. Also disclosed herein are methods of making the microstructured articles.

11 Claims, 1 Drawing Sheet

(51) Int. Cl.
*B24D 3/20* (2006.01)
*B24D 11/00* (2006.01)
*B24D 18/00* (2006.01)
*B29C 37/00* (2006.01)
*C08G 61/08* (2006.01)
*B29C 59/02* (2006.01)

(52) U.S. Cl.
CPC ....... *B24D 18/0009* (2013.01); *B29C 37/0053* (2013.01); *C08G 61/08* (2013.01); *B29C 2059/023* (2013.01); *C08G 2261/3325* (2013.01); *C08G 2261/418* (2013.01); *Y10T 428/24355* (2015.01); *Y10T 428/24479* (2015.01)

(56) References Cited

U.S. PATENT DOCUMENTS

| | | | |
|---|---|---|---|
| 4,598,102 A | 7/1986 | Leach | |
| 4,751,337 A | 6/1988 | Espy et al. | |
| 4,923,936 A * | 5/1990 | Goodall et al. | 526/115 |
| 4,940,561 A | 7/1990 | Fritz | |
| 4,943,621 A * | 7/1990 | Janda et al. | 526/127 |
| 5,008,065 A | 4/1991 | Okumura et al. | |
| 5,063,103 A * | 11/1991 | Sugawara et al. | 428/383 |
| 5,142,006 A | 8/1992 | Kelsey | |
| 5,152,917 A | 10/1992 | Pieper et al. | |
| 5,177,166 A | 1/1993 | Kobo et al. | |
| 5,198,511 A * | 3/1993 | Brown-Wensley et al. | 526/113 |
| 5,229,473 A | 7/1993 | Kobo | |
| 5,296,566 A | 3/1994 | Brown-Wensley et al. | |
| 5,312,940 A | 5/1994 | Grubbs | |
| 5,468,819 A | 11/1995 | Goodall et al. | |
| 5,691,846 A | 11/1997 | Benson, Jr. | |
| 5,828,488 A | 10/1998 | Ouderkirk | |
| 5,849,209 A | 12/1998 | Kindt-Larsen et al. | |
| 5,849,851 A | 12/1998 | Grubbs | |
| 5,919,551 A | 7/1999 | Cobb, Jr. | |
| 5,939,504 A | 8/1999 | Woodson, Jr. et al. | |
| 5,969,170 A | 10/1999 | Grubbs | |
| 5,973,085 A | 10/1999 | Mühlebach et al. | |
| 6,348,999 B1 * | 2/2002 | Summersgill et al. | 359/569 |
| 6,350,832 B1 * | 2/2002 | Bell et al. | 526/161 |
| 6,376,569 B1 | 4/2002 | Oxman | |
| 6,547,644 B1 | 4/2003 | Yamada | |
| 6,610,382 B1 | 8/2003 | Kobe et al. | |
| 6,633,722 B1 | 10/2003 | Kohara | |
| 6,800,170 B2 | 10/2004 | Kendall | |
| 6,800,234 B2 | 10/2004 | Ferguson et al. | |
| 6,828,007 B2 | 12/2004 | Obuchi et al. | |
| 6,872,792 B2 | 3/2005 | Kendall | |
| 6,904,615 B2 | 6/2005 | Kobe et al. | |
| 6,921,796 B2 | 7/2005 | Hetherington | |
| 6,953,623 B2 | 10/2005 | Olson | |
| 7,074,858 B2 | 7/2006 | Heilmann | |
| 7,326,380 B2 | 2/2008 | Mirkin | |
| 2003/0123931 A1 * | 7/2003 | Khieu et al. | 404/12 |
| 2003/0187168 A1 | 10/2003 | Sunaga et al. | |
| 2007/0037940 A1 | 2/2007 | Lazzari et al. | |
| 2007/0212522 A1 * | 9/2007 | Heidari | B82Y 10/00 428/141 |
| 2008/0062357 A1 * | 3/2008 | Suzuki | 349/96 |
| 2008/0093776 A1 | 4/2008 | Williams | |
| 2008/0153008 A1 | 6/2008 | Hayashi | |
| 2008/0232135 A1 | 9/2008 | Kinder | |

FOREIGN PATENT DOCUMENTS

| | | | |
|---|---|---|---|
| JP | 2000-075102 | 3/2000 | |
| JP | 2000/089033 | 3/2000 | |
| JP | 2000-108137 | 4/2000 | |
| JP | 2001-172371 | 6/2001 | |
| JP | 2001-228316 | 8/2001 | |
| JP | 2002-086346 | 3/2002 | |
| JP | 2006-169542 | 6/2006 | |
| JP | 2007-112935 | 5/2007 | |
| KR | 2001-0013130 A | 2/2001 | |
| WO | WO 93-13171 A2 | 7/1993 | |
| WO | WO 94-02529 A1 | 2/1994 | |
| WO | WO 9402529 A1 * | 2/1994 | C08G 61/08 |
| WO | WO 00/17712 | 3/2000 | |
| WO | WO 2004/017106 | 2/2004 | |
| WO | WO 2004/033553 | 4/2004 | |
| WO | WO 2005/046964 | 5/2005 | |
| WO | WO2005/078483 | 8/2005 | |
| WO | WO 2007/037085 | 4/2007 | |
| WO | WO 2007/137102 | 11/2007 | |

OTHER PUBLICATIONS

Feast et al., "Ring-opening polymerization of fluorine substituted bicyclo [2,2,1] hept-2-enes and -hepta-2,5-dienes," Polymer, vol. 20, Issue 10, Oct. 1979 pp. 1182-1183.

Feast et al., "Metathesis Polymerization of Fluorinated Bicyclo [2.2.1]-hept-2-enes and bicyclo [2.2.1] hepta-2,5-dienes," Journal of Molecular Catalysis, vol. 8, Issues 1-3, May 1980, pp. 277-296.

Kenneth J. Ivin, "Metathesis Polymerization," Encyclopedia of Polymer Science and Engineering, vol. 9—Liquid Crystalline Polymers to Mining Applications, John Wiley & Sons, Inc. U.S.A., 1987, p. 634-668.

Seehof et al., "Selective Reaction of Exo-Isomers in Ring-Opening Olefin Metathesis Polymerization (ROMP) of Fluoroalkyl-Substituted Norborene Derivatives," Macromolecules 1993, vol. 26, Issue 4, Feb. 1993, pp. 695-700.

Seehof et al., "Ring-opening olefin metathesis polymerization of fluoroalkyl-substituted polycyclic olefins," Die Makromolekulare Chemie, Rapid Communications, vol. 12, Issue 2, Mar. 2003, pp. 107-112.

Seehof et al., "Transition metal catalyzed metathesis polymerizations of partially fluorinated norbornene derivatives," Journal of Molecular Catalysis, vol. 76, Issues 1-3, Oct. 1992, pp. 53-63.

* cited by examiner

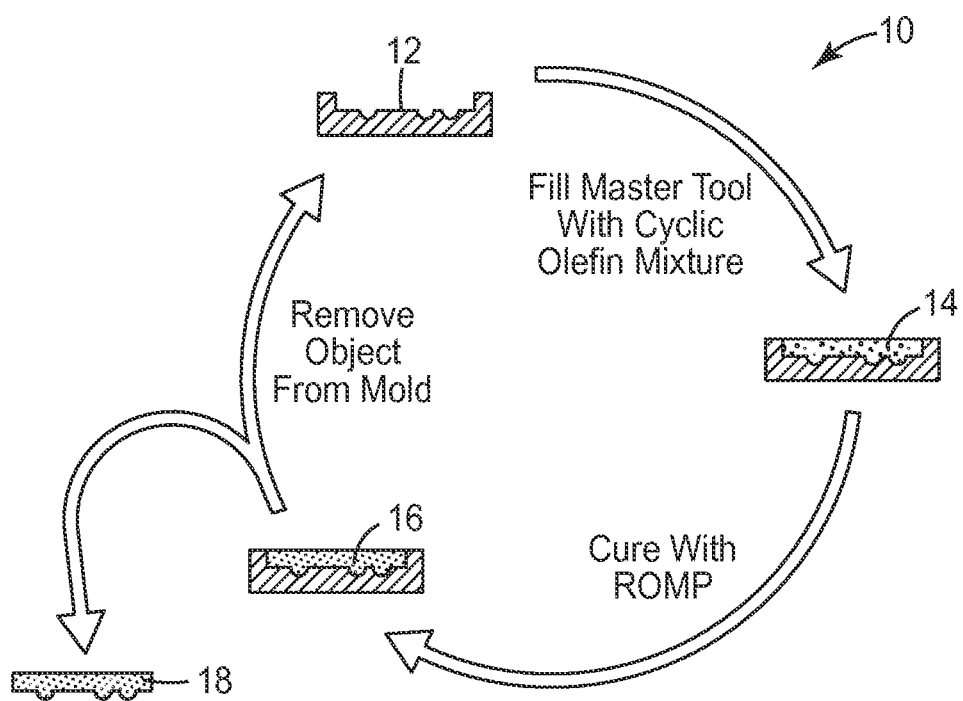

MOLDED MICROSTRUCTURED ARTICLES AND METHOD OF MAKING SAME

CROSS REFERENCE TO RELATED APPLICATION

This application is a national stage filing under 35 U.S.C. 371 of PCT/US2009/040002, filed Apr. 9, 2009, which claims priority to U.S. Provisional Application No. 61/074,428, filed Jun. 20, 2008, the disclosure of which is incorporated by reference in its entirety herein. This application is related to commonly assigned, co-pending U.S. patent application Ser. No. 12/999,022 (now U.S. Pat. No. 8,333,360) by Rule et al., entitled "Polymeric Molds and Articles Made Therefrom", and filed of even date herewith.

FIELD

This disclosure relates to molded microstructured articles and particularly, to molded microstructured articles made from cyclic olefin polymers.

BACKGROUND

Microstructured articles typically comprise articles having one or more microstructured features, i.e., features having at least one dimension of less than a few millimeters. Exemplary microstructured articles are polymeric and include abrasive articles, friction control articles, and optical articles. Microstructured articles can be made using a variety of manufacturing methods, however, regardless of the method, the microstructured features need to be adequately filled with polymer so that the article can function as desired.

SUMMARY

Disclosed herein are microstructured articles that can be made by molding. The microstructured articles comprise crosslinked unsaturated polymers formed by ring opening metathesis polymerization (ROMP) of a monomer composition, the monomer composition comprising a cyclic monomer having at least one reactive double bond.

Also disclosed herein are methods of making the microstructured articles, comprising: providing a microstructured mold; providing a monomer composition comprising: a cyclic monomer having at least one reactive double bond; and a metathesis catalyst system; contacting a surface of the microstructured mold with the monomer composition; and polymerizing the monomer composition to form a molded microstructured article comprising a crosslinked unsaturated polymer.

The microstructured articles may be structured in that they comprise at least one microstructured feature having a dimension of less than about 2 mm, or less than about 500 um. The microstructured articles may also comprise a plurality of such microstructured features. Examples of microstructured articles that can be made include light guides, brightness enhancement films, retroreflective films, and microfluidic devices. Another example of microstructured articles that can be made include abrasive articles having a plurality of abrasive composites, each of the abrasive composites comprising a plurality of abrasive grains dispersed in a binder. Yet another example of microstructured articles that can be made include friction control articles having a plurality of stems, each stem providing a static coefficient of friction when dry of at least about 0.6.

These and other aspects of the invention are described in the detailed description below. In no event should the above summary be construed as a limitation on the claimed subject matter which is defined solely by the claims as set forth herein.

BRIEF DESCRIPTION OF DRAWING

FIG. 1 shows an exemplary process flow diagram for making the molded microstructured articles disclosed herein.

DETAILED DESCRIPTION

Numerous advantages may be provided by the microstructured articles disclosed herein as well as for the methods of making the articles. The microstructured articles may have good physical strength and toughness such that they can be cleanly removed from microstructured molds. Surface replication of microstructured molds used to make the microstructured articles may be relatively efficient compared to replication involving other types of chemistries which reduces time lost from waiting for the articles to cure. Thus, the microstructured articles and methods for making the articles may enable fast production processes such as continuous cast and cure. Monomer compositions used to make the microstructured articles typically have low viscosities such that the compositions can fill in all or nearly all of the microstructures for a variety of mold designs. The monomer compositions may be relatively easy to degas during the manufacturing process, as compared to viscous compositions of, for example, thermoplastic polymers. The monomer compositions may exhibit little or no shrinkage upon curing. The use of ROMP to make micropatterned or microstructured articles can enable nanofabrication of molded articles suitable for use in, for example, electronics applications.

In general, the microstructured articles disclosed herein comprise one or more polymers prepared by ring opening metathesis polymerization of cycloalkenes initiated by olefin metathesis catalysts; see for example, K. J. Ivin, "Metathesis Polymerization" in J. I. Kroschwitz, ed., *Encyclopedia of Polymer Science and Engineering*, Vol. 9, John Wiley & Sons, Inc., U.S.A., 1987, p. 634. Metathesis polymerization of cycloalkene monomers typically yields crosslinked polymers having an unsaturated linear backbone. The degree of unsaturation of the repeat backbone unit of the polymer is the same as that of the monomer. For example, with a norbornene reactant in the presence of an appropriate catalyst, the resulting polymer may be represented by:

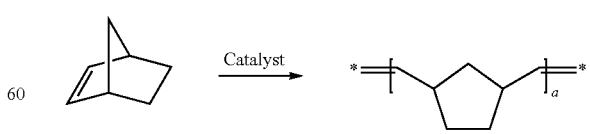

wherein a is the number of repeating monomer units in the polymer chain. For another example, with dienes such as dicyclopentadiene in the presence of an appropriate catalyst, the resulting polymer may be represented by:

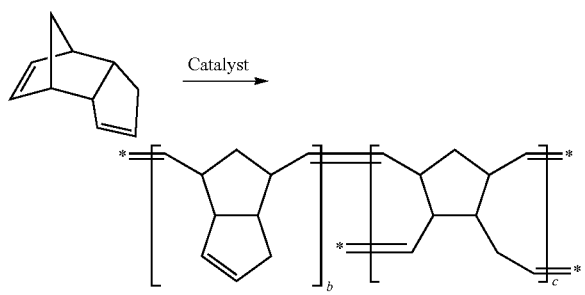

wherein b+c is the number of moles of polymerized monomer, and c/(b+c) is the mole fraction of monomer units which ring-open at both reactive sites. As shown by the above reaction, metathesis polymerization of dienes, trienes, etc. can result in a crosslinked polymer. Representative cycloalkene monomers, catalysts, procedures, etc. that can be used in metathesis polymerizations are described, for example, in Ivin; U.S. Pat. No. 4,400,340 (Klosiewicz); U.S. Pat. No. 4,751,337 (Espy et al.); U.S. Pat. No. 5,849,851 (Grubbs et al.); U.S. Pat. No. 6,800,170 B2 (Kendall et al.); and US 2007/0037940 A1 (Lazzari et al.).

The microstructured articles disclosed herein may each comprise a crosslinked unsaturated polymer formed by ring opening metathesis polymerization of a cyclic monomer having at least one reactive double bond. As used herein, double bonds are considered reactive if they can undergo ROMP under typical reaction conditions as described in the above references. As used herein, cyclic monomer refers to monomers having at least one cyclic group and may include bicyclics and tricyclics. A mixture of cyclic monomers may be used.

In some embodiments, the microstructured articles disclosed herein may each comprise a crosslinked unsaturated polymer formed by ring opening metathesis polymerization of a cyclic monomer selected from the group consisting of norbornylene, ethylidenenorbornene, cyclopentene, cyclooctene, dicyclopentadiene, tricyclopentadiene, tetracyclopentadiene, norbornadiene, 7-oxobicyclo[2.2.1]hept-2-ene, tetracyclo[6,2,13,6,0$^{2,7}$]dodeca-4,9-diene, and derivatives thereof with substituents including aliphatic groups, aromatic groups, esters, amides, ethers, and silanes. For example, a microstructured article may comprise a crosslinked unsaturated polymer formed by ring opening metathesis polymerization of a cyclic monomer consisting essentially of dicyclopentadiene.

In some embodiments, the microstructured articles disclosed herein may each comprise a crosslinked unsaturated polymer formed by ring opening metathesis polymerization of at least two different cyclic monomers, wherein each of the at least two different cyclic monomers is selected from the group consisting of norbornylene, ethylidenenorbornene, cyclopentene, cyclooctene, dicyclopentadiene, tricyclopentadiene, tetracyclopentadiene, norbornadiene, 7-oxobicyclo[2.2.1]hept-2-ene, tetracyclo[6,2,13,6,0$^{2,7}$]dodeca-4,9-diene, and derivatives thereof with substituents including aliphatic groups, aromatic groups, esters, amides, ethers, and silanes. For example, a microstructured article may comprise a crosslinked unsaturated polymer formed by ring opening metathesis polymerization of dicyclopentadiene and norbornylene, dicyclopentadiene and an alkyl norbornylene, or dicyclopentadiene and ethylidenenorbornene.

Useful alkyl norbornylenes may be represented by the formula:

wherein $R_1$ is an alkyl group comprising from 1 to 12 carbon atoms, e.g. 6 carbon atoms. An exemplary microstructured article may comprise a crosslinked unsaturated polymer formed by ring opening metathesis polymerization of dicyclopentadiene and hexylnorbornene at a weight ratio of from about 10:90 to about 50:50. Another exemplary microstructured article may comprise a crosslinked unsaturated polymer formed by ring opening metathesis polymerization of dicyclopentadiene and cyclooctene at a weight ratio of from about 30:70 to about 70:30.

Additional examples of cyclic monomers include the following polycyclic dienes:

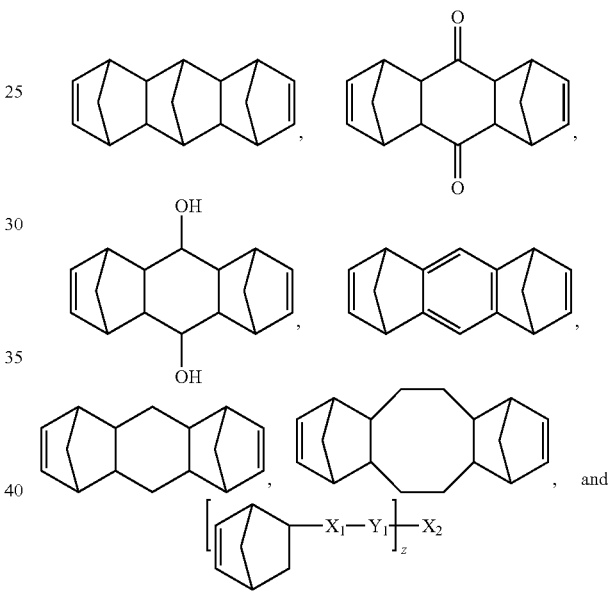

and where $X_1$ is a divalent aliphatic or aromatic group with 0 to 20 carbon atoms; $X_2$ is a multivalent aliphatic or aromatic group with 0 to 20 carbon atoms; optional group $Y_1$ is a divalent functional group selected from the group consisting of esters, amides, ethers, and silanes; and z is 2 or greater.

Metathesis polymerization of dienes, trienes, etc. can result in a crosslinked polymer as described above for dicyclopentadiene. The degree to which crosslinking occurs depends on the relative amounts of different monomers and on the conversion of the reactive groups in those monomers, which in turn, is affected by reaction conditions including time, temperature, catalyst choice, and monomer purity. In general, at least some crosslinking is desired to maintain precise dimensions of the microstructured article. The presence of crosslinking is indicated when the microstructured article does not dissolve in some solvent such as toluene, but may swell in such solvents. Also, the crosslinked polymers are thermoset and not thermoplastic and cannot be made to flow upon heating. Typically, the microstructured article becomes stiffer as the amount of crosslinking increases, thus the amount of crosslinking desired may depend on the desired stiffness of the article.

In some embodiments, the microstructured articles disclosed herein may each comprise a crosslinked unsaturated polymer formed by ring opening metathesis polymerization of a crosslinker (a multicyclic monomer comprising at least two reactive double bonds) and a monofunctional monomer. For example, the unsaturated polymer may be comprised of dicyclopentadiene and a monofunctional monomer. The monofunctional monomer may be selected from the group consisting of cyclooctene, cyclopentadiene, an alkyl norbornene, and derivatives thereof. The monomer composition may also comprise from about 0.1 to about 75 wt. % of the crosslinker, relative to the total weight of the monomer composition. If dicyclopentadiene is used as a crosslinker, useful amounts are from about 10 to about 75 wt. % of dicyclopentadiene, relative to the total weight of the monomer composition. If the polycyclic dienes shown above are used as crosslinkers, useful amounts are from about 0.1 to about 10 wt. %, relative to the total weight of the monomer composition.

In embodiments in which at least two different cyclic monomers are used to make microstructured articles, the relative amounts of the monomers may vary depending on the particular monomers and desired properties of the articles. The unsaturated polymer may comprise: from about 0 to about 100 wt. % of a multifunctional polycyclic monomer, and from about 0 to about 100 wt. % of a monofunctional cyclic monomer, both relative to the total weight of the polymer. In some embodiments, the mole ratio of multifunctional polycylic monomer to monofunctional cyclic monomer comprises from about 1:3 to about 1:7.

The desired physical properties of a given microstructured article may be used to select the particular monomer(s) used to form the unsaturated polymer of the article. If more than one monomer is used, these physical properties may also influence the relative amounts of the monomers used. Physical properties that may need to be considered include Tg and Young's Modulus. For example, if a stiff microstructured article is desired, then the particular monomer(s), and their relative amounts if more than one monomer is used, may be chosen such that the unsaturated polymer has a Tg of greater than about 25° C. and a Young's Modulus greater than about 100 MPa.

In choosing the relative amounts of comonomers for producing a microstructured article, the contribution of each monomer to the glass transition temperature of the unsaturated polymer can be used to select an appropriate ratio. If a stiff microstructured article is desired, the unsaturated polymer may have a Tg greater than about 25° C. and a Young's Modulus greater than about 100 MPa. Monomers that may be used to make stiff articles include any of those described herein and particularly norbornylene, ethylidenenorbornene, dicyclopentadiene, and tricyclopentadiene, with dicyclopentadiene being particularly preferred. Any amount of crosslinking may be present.

If a flexible article is desired, the unsaturated polymer may have a Tg less than about 25° C. and a Young's Modulus less than about 100 MPa. Monomers that may be used to make flexible articles may include combinations of crosslinkers and monofunctional cyclic monomers. Monomers that may be used to make flexible articles include any of those described herein and particularly dicyclopentadiene, cyclooctene, cyclopentene, and alkyl norbornylenes such as the ones described above wherein $R^1$ comprises from 1 to 12 carbon atoms. The monomer composition may comprise from about 0.1 to about 75 wt. % of the crosslinker, relative to the total weight of the monomer composition with preferred amounts comprising from about 1 to about 50 wt. %, or from about 20 to about 50 wt. %. An exemplary flexible microstructured article comprises dicyclopentadiene and cyclooctene at a weight ratio of from about 30:70 to about 70:30, preferably about 50:50. Another exemplary flexible microstructured article comprises dicyclopentadiene and hexylnorbornylene at a weight ratio of from about 10:90 to 50:50, preferably from about 20:80 to about 40:60.

The microstructured article is prepared from a monomer composition. Besides the monomers described above, the monomer composition comprises a metathesis catalyst, for example, catalysts described in the above references. Transition metal carbene catalysts such as ruthenium, osmium, and rhenium catalysts may be used, including versions of Grubbs catalysts and Grubbs-Hoveyda catalysts; see, for example, U.S. Pat. No. 5,849,851 (Grubbs et al.).

In some embodiments, the monomer composition comprises a metathesis catalyst system comprising a compound of the formula:

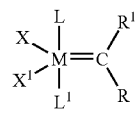

wherein:

M is selected from the group consisting of Os and Ru;

R and $R^1$ are independently selected from the group consisting of hydrogen and a substituent group selected from the group consisting of $C_1$-$C_{20}$ alkyl, $C_2$-$C_{20}$ alkenyl, $C_2$-$C_{20}$ alkoxycarbonyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy and aryloxy; the substituent group optionally substituted with a moiety selected from the group consisting of $C_1$-$C_5$ alkyl, halogen, $C_1$-$C_5$ alkoxy and phenyl; the phenyl optionally substituted with a moiety selected from the group consisting of halogen, $C_1$-$C_5$ alkyl, and $C_1$-$C_5$ alkoxy;

X and $X^1$ are independently selected from any anionic ligand; and

L and $L^1$ are independently selected from any phosphine of the formula $PR^3R^4R^5$, wherein $R^3$ is selected from the group consisting of neophyl, secondary alkyl and cycloalkyl and wherein $R^4$ and $R^5$ are independently selected from the group consisting of aryl, neophyl, $C_1$-$C_{10}$ primary alkyl, secondary alkyl, and cycloalkyl.

The metathesis catalyst system may also comprise a transition metal catalyst and an organoaluminum activator. The transition metal catalyst may comprise tungsten or molybdenum, including their halides, oxyhalides, and oxides. One particularly preferred catalyst is $WCl_6$. The organoaluminum activator may comprise trialkylaluminums, dialkylaluminumhalides, or alkylaluminumdihalides. Organotin and organolead compounds may also be used as activators, for example, tetraalkyltins and alkyltinhydrides may be used. One particularly preferred catalyst system comprises $WCl_6/(C_2H_5)_2AlCl$.

The choice of particular catalyst system and the amounts used may depend on the particular monomers being used, as well as on desired reaction conditions, desired rate of cure, and so forth. In particular, it can be desirable to include the above-described osmium and ruthenium catalysts in amounts of from about 0.001 to about 0.3 wt. %, relative to the total weight of the unsaturated polymer. For monomer compositions comprising cyclooctene, the osmium and ruthenium catalyst may be used. If the microstructured article comprises a colorless optical article, it may be desirable to limit the amount of catalyst to less than about 0.03 wt. %, relative to the total weight of the monomer composition. For monomer compositions comprising dicyclopentadiene and alkylnorbornylenes, metathesis catalyst systems comprising tungsten are useful.

The monomer composition may comprise additional components. For example, if the metathesis catalyst system comprises $WCl_6/(C_2H_5)_2AlCl$, then water, alcohols, oxygen, or any oxygen-containing compounds may be added to increase the activity of the catalyst system as described in Ivin. Other additives can include chelators, Lewis bases, plasticizers, inorganic fillers, and antioxidants, preferably phenolic antioxidants.

To maximize dimensional stability of the microstructured article, it is desirable that no solvent be included in the formulations. If solvent is used to help initially dissolve some component of the catalyst system, it is desirable to remove the solvent under vacuum before polymerizing the mixture.

If the monomer composition is sensitive to ambient moisture and oxygen, it may be desirable to maintain the reactive solutions under inert conditions. Once mixed, the monomer composition can be injected into an air-filled mold as long the polymerization is rapid and exposure to air is minimized. Preferably, the mold can be purged with an inert gas such as nitrogen before introducing the monomer composition. The polymerization can occur at room temperature, or heat can be used to help accelerate the polymerization.

Molds that may be used for making the microstructured articles disclosed herein are generally shaped, configured, etc. to be negative molds of the articles. Useful molds may comprise any desirable material such as polymer, ceramic, metal, etc. In some embodiments, for example, when a film-like microstructured article is desired, the mold may simply need to provide a structured surface with optional side walls to contain the monomer composition before sufficient polymerization has taken place. The monomer composition may be coated, poured, etc. to completely and/or partially fill any recesses.

In some embodiments, the mold may comprise an injection mold or a compression mold. In this case, the mold may comprise two halves which mate together. For injection molding, the monomer composition may be injected via an injection port into a cavity or cavities of the mold, and there is typically some output port for air, nitrogen, etc. to escape. Filling of the cavity may be facilitated by vacuum attached via the output port. For compression molding, a system of runners and sprues are typically provided to facilitate a complete filling of a cavity or cavities of the molds as well as to enable release of the molded article from the mold.

The three-dimensional topography of at least one surface of the mold may comprise one or more features that may vary in terms of shape, size, and distribution across the surface. The features may be described as recesses, cavities, relief structures, microlens, grooves, channels, etc., and they may comprise rectangular, hexagonal, cubic, hemispherical, conical, pyramidal shapes, or combinations thereof. In some embodiments, the three-dimensional topography of the surface of the mold comprises at least one microstructured feature having a dimension of less than about 2 mm, or less than about 500 um. In some embodiments, the three-dimensional topography of the surface of the mold comprises a plurality of microstructured features, each feature having a dimension of less than about 2 mm, or less than about 500 um. The mold may comprise an array of the microstructured features. Particular shapes and surface structures are described below for the molded articles.

The desired feature or features may be imparted to the surface of the mold by any suitable means, such as by drilling, machining, laser drilling, laser ablation, microcontact printing, lithography, stamping, water jet machining, casting, etching, die punching, diamond turning, engraving, knurling, and the like. The desired feature or features may also be imparted to the surface of the mold by a process referred to as multiphoton curing, see for example, WO 2007/137102 A1 (Marttila et al.).

The mold may be flexible or rigid. Useful materials that may be used to make the mold include metal, steel, ceramic, polymeric materials (including thermoset and thermoplastic polymeric materials), or combinations thereof. The materials forming the mold must have sufficient integrity and durability to withstand the particular monomer compositions to be used as well as any heat that may be applied thereto or generated by the polymerization reaction. The materials forming the mold must also be amenable to structuring as described above. The mold is desirably inexpensive to manufacture, has a long service life, consistently produces material of acceptable quality, and allows for variations in process parameters.

FIG. 1 shows an exemplary process flow diagram 10 for making the microstructured articles disclosed herein. Mold 12 having a microstructured surface is provided. Monomer composition 14 is provided and may comprise, as described above: a cyclic monomer having at least one reactive double bond. The surface of the mold is at least partially contacted with the monomer composition. As shown in FIG. 1, the mold provides a cavity which is filled with the monomer composition. The monomer composition is then polymerized such that ROMP occurs. The resulting polymer 16 forms a microstructured article. The microstructured article 18 is separated from the mold.

In some embodiments, the microstructured article comprises an optical article. Optical articles that may be made include light guides or waveguides designed to guide waves, such as light, electromagnetic waves, or sound waves. Light guides typically comprise one or more layers wherein a surface of the light guide comprises one or more light extraction features; see for example, light guides described in commonly assigned U.S. Ser. No. 11/998,831, "Improved Light Guide", Kinder et al. Optical articles that may also be made include brightness enhancement films, sometimes referred to as prismatic films, which are designed to redirect light through reflection and refraction; see for example, U.S. Pat. No. 5,828,488 (Ouderkirk et al.) and U.S. Pat. No. 5,919,551 (Cobb, Jr. et al.). Both light guides and brightness enhancement films generally comprise a polymeric layer having a plurality of microstructured features on a surface of the layer. Other types of articles that may be made include retroreflective films such as those comprising cube corner sheeting, see for example, U.S. Pat. No. 5,691,846 (Benson, Jr. et al.). Retroreflective films generally comprise a polymer layer having a multitude of interconnected cube corner elements on a surface of the layer such that incident light is retroreflected. Other types of articles that may be made include microfluidic devices having microchannels (less than 1 mm diameter) formed on silicon, glass, or quartz and through which liquids and/or gases can flow.

In some embodiments, the microstructured article comprises a structured abrasive article. One example of a structured abrasive article comprises a plurality of abrasive composites, each of the abrasive composites comprising a plurality of abrasive grains dispersed in a binder. The abrasive composites may be shaped, e.g., as pyramids, prisms, or curvilinear shapes, on a major surface of the structured abrasive article. Examples of abrasive grains which may be used include aluminum oxide, silicon carbide and the like. Examples of binders which may be used include curable resins such as urethanes, epoxies, and (meth)acrylates. One example of a structured abrasive article is disclosed in U.S. Pat. No. 5,152,917 (Pieper et al.).

In some embodiments, the microstructured article comprises a friction control article. The friction control article provides high frictional properties and good gripping performance. Useful friction control articles comprise a soft microstructured surface having an array of flexible upstanding stems of a variety of shapes. As such, friction control articles may comprise an elastomeric material such as a block polymer of some combination of styrene, isoprene, and/or butadiene. Useful friction control articles may comprise a plurality of stems, each stem providing a static coefficient of friction when dry of at least about 0.6. Examples of friction control articles are disclosed in U.S. Pat. No. 6,610,382 B1 (Kobe et al.) and U.S. Pat. No. 6,904,615 B2 (Kobe et al.).

In some embodiments, such as for the structured abrasive articles, a backing may be applied to the monomer composition such that the microstructured article is adhered or attached to the backing Materials suitable for backings include polymeric films, paper, cloth, metallic film, fiber, nonwoven substrates, and combinations and derivatives thereof.

EXAMPLES

Example 1

Friction Control Article

A piece of 1" wide GREPTILE batting tape (from 3M Co.) with a 0.75" wide array of stems was cut to 1.6" long and adhered to a glass plate. A ⅛" thick sheet of silicone with a rectangular opening 2.2"×1.2" was placed over the GREPTILE tape as a spacer. A plate of glass with a hole drilled in one corner was then placed on top of the spacer. The assembly was clamped with binder clips to give a closed mold that could be filled through the hole in the top glass plate.

HFPO refers to the end group $F(CF(CF_3)CF_2O))_dCF(CF_3)-$, wherein d averages from 4 to 20. HFPO—$CONHCH_2CH_2OCOCH=CH_2$ (HFPO-AEA) was prepared as described in Preparation 31A of US 2006/0216500 (Klun et al.). A mixture of HFPO-AEA (40.00 g, 0.029 mol) and cyclopentadiene (2.73 g, 0.041 mol, freshly prepared from dicyclopentadiene) was mixed at room temperature for 30 minutes. The mixture was then heated to 55° C. for 4 hours. The mixture was then placed under vacuum to remove excess cyclopentadiene. The product (HFPO-NB) was obtained as a yellow liquid (yield 40.17 g, 97%).

HFPO-NB (60 mg) was dissolved in dicyclopentadiene (40 g, Acros) by heating. Upon cooling, the mixture changed from transparent to hazy. Bis(tricyclohexylphosphine)benzylidine ruthenium(IV) chloride (160 mg, freeze-dried) was then mixed in for 60 s with a Flack-Tek DAC 150 FV speed mixer. The ruthenium catalyst was purchased as Grubbs catalyst, $1^{st}$ generation from Aldrich Co. A portion of this solution was transferred to the GREPTILE-templated mold. The sample was allowed to cure overnight at 40° C. The resulting polymer was then removed, and the GREPTILE tape was peeled away to leave a negative pattern. This mold was then treated with LPS Dry Film PTFE lubricant.

A catalyst stock solution was prepared with 1,3-bis-(2,4,6-trimethylphenyl)-2-(imidazolidinylidene)(dichlorophenylmethylene)(tricyclohexylphosphine)ruthenium (10 mg) and xylene (0.10 mL). The ruthenium catalyst was purchased as Grubbs Catalyst, $2^{nd}$ generation from Aldrich Co. A separate solution was prepared with dicyclopentadiene (3 g, Alfa Aesar), cyclooctene (3 g, Acros), and IRGANOX 1010 (0.060 g, Ciba). A portion of the catalyst solution (0.042 mL) was transferred to the monomer solution and mixed briefly. The solution was then transferred to the inverse GREPTILE pattern mold and placed under vacuum for 30 seconds. (Comparable trials without the vacuum step resulted in poor filling of the microfeatures.) The vacuum jar was backfilled with $N_2$, and the sample was left to cure for 1 h. It was then postcured for an additional hour at 100° C. The resulting elastomer was peeled away from the mold to give a GREPTILE-like film.

The performance of the material as a friction control article was evaluated using a dynamic shear strength test modeled after U.S. Pat. No. 6,610,382 (Kobe et al.). A sample of the ROMP-derived stem web was cut to 1.5"×0.75" and was adhered to a 1"×4"×1/16" steel coupon. This steel coupon was adhered to the moving platform of a peel tester. Another piece of the stem web 0.5"×0.75" was taped to an identical steel coupon. This was positioned face down over the top of the first stem web sample so that the stems of the two samples engaged each other. This coupon was then attached to the load cell of the peel tester. The coupon weighed 32 g. A cross bar was fixed over the top of the two coupons with a small gap such that the two stem webs could not entirely disengage from each other. The platform was moved at 12 in/min for 2 sec during which time the two stem web samples were engaged as they moved past each other. The average shear force was recorded, and the median value for five trials was 34 oz./in². A control sample was performed using flat substrates made from the same ROMP formulation. The median dynamic shear strength with the non-micropatterned surface was 6.1 oz./in².

Example 2

Abrasive Article

A nickel tool with square-pyramidal microstructures having bases nominally 500 microns on each side was used as the master pattern.

A ROMP process was used to generate a mold with the inverse of this micropattern. A ⅛" thick silicone sheet with rectangular opening 4"×1.5" was clamped over the nickel master with binder clips. This was then sprayed with silicone lubricant as a mold release. A catalyst stock solution was prepared with $PPh_3$ (5 mg) and Grubbs Catalyst, $2^{nd}$ generation (25 mg) in xylenes (0.5 g). Separately, a solution of IRGANOX 1010 (0.20 g, Ciba) in dicyclopentadiene (20 g, Aldrich with 4% ENB) was prepared. 15 g of this solution was filtered through a 0.2 micron syringe filter. 0.075 mL of the catalyst solution was added to the dicyclopentadiene solution, it was mixed briefly, and then it was poured onto the master pattern. It was allowed to gel at RT and then postcured for 1 h at 100° C. The poly(dicyclopentadiene) mold was then removed from the master. It was sprayed with PTFE Dry Film Lubricant as a release agent.

A 1/16" silicone film with a rectangular 1"×1.5" opening was clamped onto the poly(dicyclopentadiene) mold. A catalyst stock solution of $PPh_3$ (8 mg) and Grubbs Second Generation catalyst (8 mg) in xylene (0.20 g) was prepared. A filtered solution of Irganox 1010 (0.05 g) in dicyclopentadiene (5 g) was prepared, and 0.050 mL of the catalyst stock solution was added to it. It was mixed briefly, and cabosil M5 (0.05 g) and aluminum oxide powder (4.95 g) were added. It was again mixed briefly. It was poured onto the poly(dicyclopentadiene) mold surface and degassed under vacuum for 30 s. A 1"×2" piece of glass was placed over the top of the sample, and it was allowed to cure for 5 min at RT. It was then postcured for 20 min at 100° C.

To measure the performance of this patterned ROMP composite as an abrasive, a 1"×1" area of a steel sheet was coated with a 20 mil (510 micron) layer of spray paint. After rubbing the painted area by hand 500 times with the micropatterned ROMP composite, the paint coating was measured to be 13 mils (330 microns) thick. After an additional 500 strokes with the abrasive, the thickness was 11 mils (280 microns).

Example 3

Prism Film

A sample of brightness enhancement film with micropatterned prisms (50 microns wide at the base) was used as the master pattern. A 4.5"×3.5" piece of this BEF film was adhered to a plate of glass to keep it flat.

A catalyst stock solution was prepared with $PPh_3$ (2.5 mg) and Grubbs Catalyst, $2^{nd}$ generation (10 mg) in xylenes (0.20 g). A 0.015 mL portion of this solution was added to 4 g of a filtered solution of 1% IRGANOX 1010 (Ciba) in dicyclopentadiene (Aldrich, 4% ENB). A portion of this solution was poured onto the BEF film master. The sample was degassed for 30 seconds in a vacuum jar. Additional catalyzed solution was then added, and it was then covered with a 3"×4" piece of glass with two cover slips attached as 10 mil spacers. The sample was cured for 15 min at 100° C. The resulting 10 mil thick film was removed from the mold.

The sample was tested for retroreflectivity using a Retro-Meter 2 instrument with an entrance angle of 4.0° and an observation angle of 0.2°. The measured coefficient of retroreflection reached a maximum when the microreplicated prisms were aligned perpendicular to the plane containing the entrance angle. This maximum observed value was 350 cd/lx/m².

What is claimed is:

1. A molded microstructured article comprising a thermoset crosslinked unsaturated polymer formed by ring opening metathesis polymerization of a monomer composition, the monomer composition comprising a cyclic monomer having at least one reactive double bond, wherein the article comprises a plurality of microstructured features formed in the thermoset crosslinked unsaturated polymer, the features comprising relief structures, each microstructured feature having a dimension of less than about 2 mm, wherein the plurality of microstructured features comprises an array of flexible upstanding stems, and wherein the cyclic monomer comprises at least two different monomers, wherein each of the at least two different monomers is selected from the group consisting of norbornylene, ethylidenenorbornene, cyclopentene, cyclooctene, dicyclopentadiene, tricyclopentadiene, tetracyclopentadiene, norbornadiene, 7-oxobicyclo[2.2.1]hept-2-ene, tetracyclo[6,2,13,6,0$^{2,7}$]dodeca-4,9-diene, hexylnorbornene, cyclopentadiene, alkyl norbornene, and derivatives thereof.

2. The molded microstructured article of claim 1, the cyclic monomer consisting essentially of dicyclopentadiene.

3. The molded microstructured article of claim 1, the cyclic monomer comprising dicyclopentadiene and norbornylene.

4. The molded microstructured article of claim 1, the cyclic monomer comprising dicyclopentadiene and hexylnorbornene at a weight ratio of from about 10:90 to about 50:50.

5. The molded microstructured article of claim 1, the cyclic monomer comprising a crosslinker and a monofunctional monomer; wherein the crosslinker comprises dicyclopentadiene; and wherein the monofunctional monomer is selected from the group consisting of cyclooctene, cyclopentadiene, an alkyl norbornene, and derivatives thereof.

6. The molded microstructured article of claim 5, wherein the monomer composition comprises from about 0.1 to about 75 wt. % of the crosslinker, relative to the total weight of the monomer composition.

7. The molded microstructured article of claim 1, wherein the plurality of microstructured features comprises an array of the microstructured features, each microstructured feature having a dimension of less than about 2 mm.

8. The molded microstructured article of claim 1, wherein each microstructured feature has a dimension of less than about 500 µm.

9. The molded microstructured article of claim 1, wherein the plurality of microstructured features comprises a plurality of abrasive composites, each of the abrasive composites comprising a plurality of abrasive grains dispersed in a binder.

10. The molded microstructured article of claim 1, wherein each stem provides a static coefficient of friction when dry of at least about 0.6.

11. The molded microstructured article of claim 1, wherein a shape of each of the plurality of microstructured features comprises a rectangular shape, a hexagonal shape, a cubic shape, a hemispherical shape, a conical shape, a pyramidal shape, a prism shape, or a curvilinear shape.

* * * * *